(12) United States Patent
Liu et al.

(10) Patent No.: US 11,319,471 B2
(45) Date of Patent: May 3, 2022

(54) CURABLE SILICONE OPTICALLY CLEAR ADHESIVES AND USES THEREOF

(71) Applicant: Henkel IP & Holding GmbH, Duesseldorf (DE)

(72) Inventors: Yuxia Liu, Dayton, NJ (US); Matthew Ahearn, Jersey City, NJ (US); Abhirami Narthana, Belle Mead, NJ (US)

(73) Assignee: Henkel AG & CO. KGaA, Dusseldorf (DE)

( * ) Notice: Subject to any disclaimer, the term of this patent is extended or adjusted under 35 U.S.C. 154(b) by 107 days.

(21) Appl. No.: 16/774,366

(22) Filed: Jan. 28, 2020

(65) Prior Publication Data

US 2020/0157395 A1 May 21, 2020

Related U.S. Application Data

(63) Continuation of application No. PCT/US2018/045097, filed on Aug. 3, 2018.

(60) Provisional application No. 62/540,786, filed on Aug. 3, 2017.

(51) Int. Cl.
| | | |
|---|---|---|
| *C09J 183/06* | (2006.01) | |
| *B32B 7/12* | (2006.01) | |
| *B32B 27/28* | (2006.01) | |
| *C08G 77/20* | (2006.01) | |

(52) U.S. Cl.
CPC .............. *C09J 183/06* (2013.01); *B32B 7/12* (2013.01); *B32B 27/283* (2013.01); *B32B 2405/00* (2013.01); *C08G 77/20* (2013.01)

(58) Field of Classification Search
CPC ........ C08G 77/16; C08G 77/12; C08G 77/08; C08L 2205/025; C07F 7/188; C09J 183/04; B01J 21/06; B01J 23/42
See application file for complete search history.

(56) References Cited

U.S. PATENT DOCUMENTS

| | | | |
|---|---|---|---|
| 2,676,182 A | 4/1954 | Daudt et al. | |
| 2,814,601 A | 11/1957 | Currie et al. | |
| 3,700,633 A | 10/1972 | Wald et al. | |
| 4,313,988 A | 2/1982 | Koshar et al. | |
| 4,507,187 A | 3/1985 | Jacobine et al. | |
| 4,534,838 A | 8/1985 | Lin et al. | |
| 4,536,265 A | 8/1985 | Fabrizio et al. | |
| 5,100,976 A | 3/1992 | Hamada et al. | |
| 5,171,760 A | 12/1992 | Kaszas et al. | |
| 5,300,608 A | 4/1994 | Chu et al. | |
| 5,607,997 A * | 3/1997 | Kimura ................. | C08L 83/04 523/212 |
| 5,665,823 A | 9/1997 | Saxena et al. | |
| 5,869,556 A | 2/1999 | Cifuentes et al. | |
| 6,140,444 A | 10/2000 | Levandoski et al. | |
| 6,187,834 B1 | 2/2001 | Thayer et al. | |
| 6,399,805 B2 | 6/2002 | Wolf et al. | |
| 6,448,303 B1 | 9/2002 | Paul | |
| 7,911,699 B2 | 3/2011 | Wang et al. | |
| 8,013,314 B2 | 9/2011 | Levandoski et al. | |
| 9,018,304 B2 | 4/2015 | Kim et al. | |
| 2002/0026049 A1 | 2/2002 | Wolf et al. | |
| 2003/0109599 A1 | 6/2003 | Kamen | |
| 2003/0212229 A1 | 11/2003 | Levandoski et al. | |
| 2007/0026509 A1 | 2/2007 | Rogers et al. | |
| 2010/0168313 A1 | 7/2010 | Mizuno et al. | |
| 2012/0045635 A1 | 2/2012 | Aoki | |
| 2013/0224416 A1 | 8/2013 | Cho et al. | |
| 2013/0321991 A1 | 12/2013 | Lee et al. | |
| 2015/0056757 A1 | 2/2015 | Liu et al. | |
| 2016/0025965 A1 | 1/2016 | Eguchi | |
| 2017/0145267 A1 | 5/2017 | Liu et al. | |

FOREIGN PATENT DOCUMENTS

| | | |
|---|---|---|
| CN | 1958704 A | 5/2007 |
| CN | 101558129 A | 10/2009 |
| CN | 102399528 A | 4/2012 |
| CN | 102533132 A | 7/2012 |
| CN | 103333276 A | 10/2013 |
| CN | 103834354 A | 6/2014 |
| CN | 104152104 A | 11/2014 |
| CN | 105086926 A | 11/2015 |
| CN | 105524589 A | 4/2016 |
| CN | 106047184 A | 10/2016 |
| CN | 106147694 A | 11/2016 |

(Continued)

OTHER PUBLICATIONS

Fouassier, Jean-Pierre, "Photoinitiation, Photopolymerization and Photocuring: Fundamentals and Applications," Hanser Publishers, 1995.

(Continued)

*Primary Examiner* — Kuo Liang Peng
(74) *Attorney, Agent, or Firm* — Sun Hee Lehmann; Steven C. Bauman

(57) ABSTRACT

Silicone optically clear adhesives compositions and films with pressure sensitive properties are described. The silicone optically clear adhesives compositions are thermal, UV curable, or UV-moisture dual curable. The silicone optically clear adhesives are suitable for sealing and bonding cover glasses, touch panels, diffusers, rigid compensators, heaters, and flexible films, polarizers and retarders in the optical display devices, and are particularly suitable in flexible and foldable displays.

10 Claims, 2 Drawing Sheets

(56) References Cited

FOREIGN PATENT DOCUMENTS

| EP | 0816464 | A2 | 1/1998 |
|---|---|---|---|
| EP | 1175467 | B1 | 6/2006 |
| WO | 2004108799 | A1 | 12/2004 |
| WO | 2011053615 | A1 | 5/2011 |
| WO | 2011133408 | A2 | 10/2011 |
| WO | 2012012067 | A1 | 1/2012 |
| WO | 2012085364 | A1 | 6/2012 |
| WO | 2014095724 | A1 | 6/2014 |
| WO | 2016008130 | A1 | 1/2016 |
| WO | 2016025965 | A1 | 2/2016 |
| WO | 2016141546 | A1 | 9/2016 |
| WO | 2016141547 | A1 | 9/2016 |
| WO | 2016173600 | A1 | 11/2016 |
| WO | 2016196460 | A1 | 12/2016 |
| WO | 2017120743 | A1 | 7/2017 |
| WO | 2017159969 | A1 | 9/2017 |

OTHER PUBLICATIONS

Ohshita, J.; Taketsugu, R.; Nakahara, Y.; and Kunai, A. "Convenient synthesis of alkoxyhalosilanes from hydrosilanes" Journal of Organometallic Chemistry, vol. 689, Issue 20, Sep. 29, 2004, pp. 3258-3264.

Kosolapoff, Gennady, M. "A New Synthesis of Phosphinic Acids." Journal of the American Chemical Society, 1950, vol. 72, No. 9, pp. 4292-4293.

Liao, T.P. et al. "New Telechelic Polymers and Sequential Copolymers by Polyfunctional Initiator-Transfer Agents (Inifers)," Polymer Bulletin, Springer-Verlag, vol. 6, No. 3-4, 1981, pp. 135-141.

Boyd, E. Andrew et al. "Facile Synthesis of Functionalised Phenylphosphinic Acid Derivatives" Tetrahedron Letters, vol. 37, No. 10, 1996, pp. 1651-1654.

Huber, A. et al. "Phosphorous-Functionalized Bis(acyl)phophane Oxides for Surface Modification" Angew. Chem. Int. Ed. 2012, 51, pp. 4648-4652. Retrieved from: https://onlinelibrary.wiley.com/doi/epdf/10.1002/anie.201201026.

Wang YZ, Yuan SL, Lu L, Zou BJ. "Research on silicone sealant for monitor roofs," Silicone Material. Mar. 30, 2006;vol. 2 (20); pp. 70-74.

Zhang, Hua et al., "Preparation of ZDM-95 Organosilicon Sealing Glue for Room Temperature Vulcanization," Fine Chemicals, No. 3, pp. 24-26; Jun. 15, 1996.

\* cited by examiner

US 11,319,471 B2

CURABLE SILICONE OPTICALLY CLEAR ADHESIVES AND USES THEREOF

FIELD OF THE INVENTION

The invention relates to curable silicone optically clear adhesives as laminating films or encapsulants, suitable for adhering display electronic devices, e.g., LCD displays, LED displays, flexible and foldable displays, and touch screens.

BACKGROUND OF THE INVENTION

Optically clear adhesive films (OCA) or liquid optically clear adhesives (LOCA) are used to bond a cover glass, a touch panel, and other layers in display devices; to fill the air gaps between different layers of the display devices; and to improve the image quality and the durability of the displays. Optically clear adhesives in LCD and LED displays oftentimes can delaminate and leak light after long term use. The adhesive delamination is particularly severe for flexible and foldable display devices due to constant dynamic and static folding. Long term use and prolonged folding of the devices exacerbates this stress and strain buildup and delamination can occur at the interfaces, and as a result, the image quality of the display deteriorates.

Many existing OCA films have high modulus, poor substrate wet-out, and poor gap filling during the assembly process, and this problem is exacerbated for substrates that contain indentations created by components on substrates such as, electrodes, bus bars, ink steps, and integrated circuits.

Many efforts have been made to address this stress and strain buildup for display devices. For example, WO 2016141546 discloses a silicone LOCA compositions to reduce delamination and stress. However, the adhesive compositions suffer from the loss of optical properties under high temperature/humidity conditions after 500 hours. Similarly, WO 2016/141547 discloses a silicone based LOCA compositions to address the stress and strain buildup; but again, the optical transmittance suffers under high temperature/humidity conditions.

US 2015/0056757 discloses a curable polyisobutylene-based encapsulant film for electronic display devices that have pressure sensitive adhesive properties. The polyisbutylene-based film has a tendency to discolor when exposed to temperature aging greater than 95° C.

WO2016/025965 discloses a low modulus hot melt adhesives with pressure sensitive adhesive properties. The hot melt adhesive is based on styrenic block copolymer. Again, styrenic block copolymer film tends to discolor at elevated temperature and under UV aging conditions.

Little effort has been made to provide silicone-based optically clear adhesive which are pressure sensitive films. More recently, a silicone assembly layer for a flexible device was described in WO2016196460. A mixture of a physically cross-linked silicone elastomer and a covalently cross-linked silicone elastomer, which is silicone polyuria and silicone polyoxamide polymers, is first formed as a mixture. It is then blended with a silicone resin. The blended silicone resin fails to effectively reinforce the cohesive strength of the silicone assembly layer and this leads to poor cohesive strength.

Therefore, there is a need in the art for silicone optically clear adhesives that have pressure sensitive adhesive properties, low modulus, high cohesive strength, and good adhesion. The current invention fulfills this need.

BRIEF SUMMARY OF THE INVENTION

The invention provides curable silicone optically clear adhesive compositions with pressure sensitive adhesive properties useful for sealing and adhering substrate layers in the display electronic devices. The cured silicone optically clear adhesive films reduce stress and strain buildup from folding, and enhance light transmission and optical effects for a prolonged time in a wide range of temperatures and humidity conditions.

One aspect of the invention is directed to a thermally curable silicone optically clear adhesive comprising:
(a) about 95 to about 99.999% of a reaction product of:
    (i) about 1 to about 30% of a hydroxy terminated siloxane polymer having a number average molecular weight (Mn) greater than about 50,000 g/mol;
    (ii) about 10 to about 50% of a hydroxy terminated siloxane polymer having Mn less than about 30,000 g/mol;
    (iii) about 10 to about 50% of a reactive silicone resin;
    (iv) about 0.1 to about 10% of a vinylalkoxy functional silane; and
    (v) about 0.001 to about 1% of (v1) an acid having a pKa value equal to or less than −6 or (v2) a base catalyst having a pKa value equal to or greater than 15;
(b) about 0.1 to about 10% of a hydride functional siloxane polymer; and
(c) about 0.001 to about 5% of a thermally curing catalyst.

Upon curing, the thermally cured silicone optically clear adhesive has a balance of both elastic shear modulus (G') at 25° C., less than about $1.5 \times 10^6$ dyn/cm, and T-peel adhesion, greater than about 1 oz/in between two PET substrates according to ASTM D1876.

Yet another aspect of the invention is directed to a method of forming a thermally curable silicone optically clear adhesive comprising the steps of:
(1) preparing a reaction product by mixing in an organic solvent at about 60 to about 150° C. of:
    (i) about 1 to about 30% of a hydroxy terminated siloxane polymer having a Mn greater than about 50,000 g/mol;
    (ii) about 10 to about 50% of a hydroxy terminated siloxane polymer having Mn about 30,000 g/mol;
    (iii) about 10 to about 50% of a reactive silicone resin;
    (iv) about 0.1 to about 10% of a vinylalkoxy functional silane; and
    (v) about 0.001 to about 1% of (v1) an acid having a pKa value equal to or less than −6 or (v2) a base catalyst having a pKa value equal to or greater than 15; and
(2) adding about 0.1 to about 5% of a hydride functional siloxane polymer; and about 0.001 to about 5% of a thermally curing catalyst at room temperature.

Another aspect of the invention is directed to a UV curable silicone optically clear adhesive composition comprising a mixture of:
(a) about 95 to about 99.999% of a reaction product of:
    (i) about 1 to about 30% of a hydroxy terminated siloxane polymer having a Mn greater than about 50,000 g/mol;
    (ii) about 10 to about 50% of a (meth)acryloxyalkyl alkoxy terminated siloxane polymer having a Mn less than about 50,000 g/mol;
    (iii) about 10 to about 50% of a reactive silicone resin; and
    (iv) about 0.001 to about 1% of (v1) an acid having a pKa value equal to or less than −6 or (v2) a base catalyst having a pKa value equal to or greater than 15; and (b) about 0.001 to about 5% of a photoinitiator.

Upon curing, the UV cured silicone optically clear adhesive has a balance of both elastic shear modulus (G') at 25° C., less than about 1.5×10$^6$ dyn/cm, and T-peel adhesion, greater than about 1 oz/in between two PET substrates according to ASTM D1876.

In a further aspect of the invention is directed to a method of forming a UV curable silicone pressure sensitive adhesive comprising the steps of:
(1) prepare a reaction product by mixing in an organic solvent at about 60 to about 150° C. of:
 (i) about 1 to about 30% of a hydroxy terminated siloxane polymer having Mn greater than about 50,000 g/mol;
 (ii) about 10 to about 50% of a (meth)acryloxyalkyl alkoxy terminated siloxane polymer having Mn lower than 50,000 g/mol;
 (iii) about 10 to about 50% of a reactive silicone resin;
 (iv) about 0.001 to about 1% of (v1) an acid having a pKa value equal to or less than −6 or (v2) a base catalyst having a pKa value equal to or greater than 15; and
(2) adding about 0.001 to about 5% of a photoinitiator at room temperature.

These and other aspects of the invention are described in the detailed description below. In no event should the above summary be construed as a limitation on the claimed subject matter which is defined solely by the claimed as set forth herein.

DETAILED DESCRIPTION OF THE INVENTION

Figure 1:
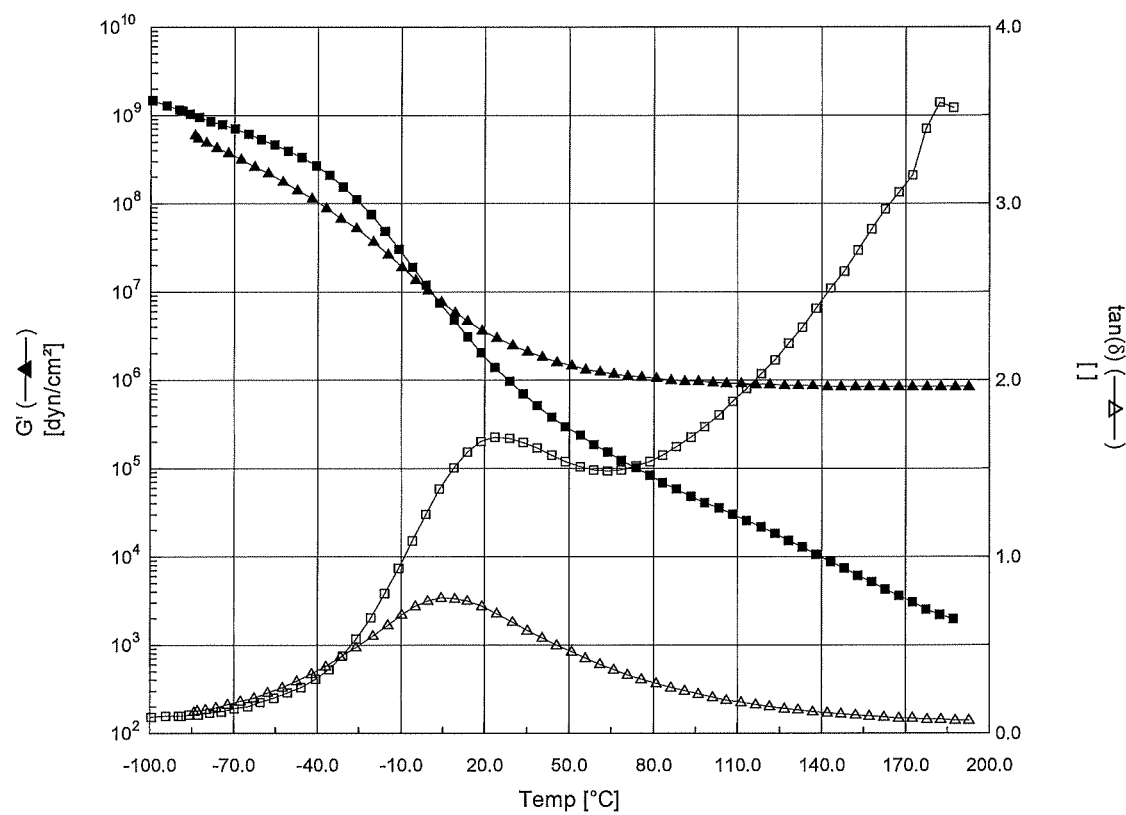
FIG. 1 is a RDA Temperature Sweep (modulus curve and tan delta verses temperature at strain greater than 30%, 10 rad/s) of thermally cured silicone pressure sensitive adhesive film.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of and "consisting essentially of the enumerated ingredients/steps, which allows the presence of only the named ingredients/steps, along with any impurities that might result therefrom, and excludes other ingredients/steps.

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values. As used herein, approximating language may be applied to modify any quantitative representation that may vary without resulting in a change in the basic function to which it is related. Accordingly, a value modified by a term or terms, such as "about," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11", and "about 1" may mean from 0.9-1.1. Other meanings of "about" may be apparent from the context, such as rounding off, so, for example "about 1" may also mean from 0.5 to 1.4.

As used in herein, the term, "essentially free" means that the compositions may not include more than trace amounts of the named component.

As used herein, the term, "curable silicone optically clear adhesive" is an adhesive mixture with solvent that is ready to be formed into a thin film upon removal of the solvent.

The term, "radiation cure" herein refers to toughening, hardening or vulcanization of the curable portion of the film through actinic radiation exposure. Actinic radiation is electromagnetic radiation that induces a chemical change in a material, including electron-beam curing, ultraviolet (UV) and visible light curing. The initiation of this cure is achieved through the addition of an appropriate photoinitiator. The cure of the silicone optically clear adhesive is achieved by direct exposure to ultraviolet (UV) or visible light or by indirect exposure through transparent substrate or cover sheet that are made of polyester, polyamide, polycarbonate, glass, and the like.

The term, "thermal cure" or thermally curable" herein refers to hardening or vulcanization of the curable portion of the material by cross-linking of polymer chains, brought about by heat.

The term, "moisture cure" herein refers to hardening or vulcanization of the curable portion of the material by cross-linking of polymer chains, brought about by water or moisture in the air.

As used herein, a polymer or an oligomer is a macromolecule that consists of monomer units is equal or greater than about two monomer units. Polymer and oligomer, or polymeric and oligomeric, are used interchangeably here in the invention.

As used herein, the terms "reactive" refer to a molecule's ability to undergo condensation reaction in the presence of an acid or a base, or an organic metal catalyst.

As used herein, the terms "pressure sensitive adhesive" or "PSA," used interchangeably, refer to a viscoelastic material which adheres instantaneously to most substrates with an application of slight pressure and remains permanently tacky.

As used herein, the term "alkyl" refers to a monovalent linear, cyclic or branched moiety containing C1 to C24 carbon and only single bonds between carbon atoms in the moiety and including, for example, methyl, ethyl, propyl, isopropyl, n-butyl, sec-butyl, isobutyl, tert-butyl, n-pentyl, n-hexyl, heptyl, 2,4,4-trimethylpentyl, 2-ethylhexyl, n-octyl, n-nonyl, n-decyl, n-undecyl, n-dodecyl, n-hexadecyl, n-octadecyl and n-eicosyl.

As used herein, the term "aryl" refers to an monovalent unsaturated aromatic carbocyclic group of from 6 to 24 carbon atoms having a single ring (e.g., phenyl) or multiple condensed (fused) rings, wherein at least one ring is aromatic (e.g.,naphthyl, dihydrophenanthrenyl, fluorenyl, or anthryl). Preferred examples include phenyl, methyl phenyl, ethyl phenyl, methyl naphthyl, ethyl naphthyl, and the like.

As used herein, the term "alkoxy" refers to the group -O-R wherein R is alkyl as defined above.

As used herein, the term "Me" in silicone MQ resins refers to methyl group.

As used herein, the term "(meth)acryloxy group" represents both acryloxy and methacryloxy group.

As used herein, the above groups may be further substituted or unsubstituted. When substituted, hydrogen atoms on the groups are replaced by substituent group(s) that is(are) one or more group(s) independently selected from alkyl, alkenyl, alkynyl, cycloalkyl, cycloalkenyl, cycloalkynyl, aryl, heteroaryl, heteroalicyclyl, aralkyl, heteroaralkyl, (heteroalicyclyl)alkyl, hydroxy, protected hydroxyl, alkoxy, aryloxy, acyl, ester, mercapto, alkylthio, arylthio, cyano, halogen, carbonyl, thiocarbonyl, O-carbamyl, N-carbamyl, O-thiocarbamyl, N-thiocarbamyl, C-amido, N-amido, S-sulfonamido, N-sulfonamido, C-carboxy, protected C-carboxy, O-carboxy, isocyanato, thiocyanato, isothiocyanato, nitro, silyl, sulfenyl, sulfinyl, sulfonyl, haloalkyl, haloalkoxy, trihalomethanesulfonyl, trihalomethanesulfonamido, and amino, including mono- and di-substituted amino groups, and the protected derivatives thereof. In case that an aryl is substituted, substituents on an aryl group may form a non-aromatic ring fused to the aryl group, including a cycloalkyl, cycloalkenyl, cycloalkynyl, and heterocyclyl.

As used herein, the term "optically clear" or "optical clarity" refers to (1) transmittance of a film of 90% or greater measured in accordance with ASTM E903 at 500 nm; (2) haze of a film of 1% or less measured in accordance with ASTM D1003; and (3) yellow index b* of a film of 1% or less measured in accordance with ASTM D1003.

As used herein, the terms "optically clear adhesive," and "OCA," used interchangeably, refers to adhesive that has optical clarity.

As used herein, the terms "liquid optically clear adhesive," and "LOCA," used interchangeably, refers to adhesive that has optical clarity in a liquid form.

As used herein, the terms "display device" and "display electronic device," used interchangeably, refer to an article that has various components such as, circuits or active layers in between a cover front sheet and a substrate back sheet, and operates by manipulating the flow of electrons, e.g., displays, including flexible and foldable displays, outdoor displays, LCD displays, LED displays; diffusers; rigid compensators; heaters; flexible polarizers; touchscreens; flexible thin film photovoltaic cells; mobile phone; tablet PC; TV; notebook PC; digital camera; photo frame; car navigation; and the like.

As used herein, the terms "film," "tape," and "encapsulants" used interchangeably, refer to an adhesive in a free-standing form that adhere the components and/or substrates together in the devices.

One aspect of the invention is directed to a thermally curable silicone optically clear adhesive comprising
  (a) about 95 to about 99.999% of a reaction product of:
    (i) about 1 to about 30% of a high molecular weight hydroxy terminated siloxane polymer having a number average molecular weight greater than about 750,000 g/mol;
    (ii) about 10 to about 50% of a low molecular weight hydroxy terminated siloxane polymer having a number average molecular weight less than about 30,000 g/mol;
    (iii) about 10 to about 50% of a reactive silicone resin;
    (iv) about 0.1 to about 10% of a vinylalkoxy functional silane; and
    (v) about 0.001 to about 1% of (v1) an acid having a pKa value equal to or less than −6 or (v2) a base catalyst having a pKa value equal to or greater than 15;
  (b) about 0.1 to about 10% of a hydride functional siloxane polymer; and
  (c) about 0.001 to about 5% of a thermally curing catalyst.

For the thermally curable silicone OCA, the reaction product is made by mixing (i) about 1 to about 30% of a high molecular weight hydroxy terminated siloxane polymer having a number average molecular weight greater than about 50,000 g/mol; (ii) about 10 to about 50% of a low molecular weight hydroxy terminated siloxane polymer having a number average molecular weight less than about 30,000 g/mol; (iii) about 10 to about 50% of a reactive silicone resin; (iv) about 0.1 to about 10% of a vinylalkoxy functional silane and (v) about 0.001 to about 1% of (v1) an acid having a pKa value equal to or less than −6 or (v2) a base catalyst having a pKa value equal to or greater than 15; in an organic solvent at elevated temperature of about 60 to about 150° C.

Two types of reactive siloxane polymers are used to form the reaction product. The first type of reactive siloxane polymers is high molecular weight polymer with the number average molecular weight (Mn) above 50,000 g/mol, preferably, from about 75,000 to about 1,000,000 g/mol. The high molecular weight reactive siloxane polymer will provide high cohesive strength, peel adhesion and elongation. The second type of reactive siloxane polymers is low molecular weight polymer with the number average molecular weight (Mn) below 30,000 g/mol, preferably from about 5,000 to about 20,000 g/mol. The second type of siloxane polymer will provide adjustable crosslinking density and viscosity of the adhesive. High and low molecular weight reactive siloxane polymers are used together to regulate the crosslinking density and the modulus of the adhesive films.

For both reactive siloxane polymers, they are polydiorganosiloaxane polymers having α,ω-endcapped OH, H or alkoxy groups. In a preferred embodiment, polydiorganosiloaxane polymers are polydialkylsiloxane, polydiarylsiloaxane, polyalkylarylsiloaxane polymer, with at least two or more (RR'SiO) unit, wherein R and R' are independently alkyl or aryl. In a most preferred embodiment, polydiorganosiloaxane polymers are hydroxyl terminated polydimethylsiloxane polymers (PDMS). Other polydiorganosiloxane polymers include siloxane polymers with one or more the diorgano substitutes of methylvinyl, methylethyl, methylepoxyalkly and 3,3,3-trifluoropropylmethyl.

The reactive silicone resin is a 3-D network of siloxane polymer that contains a combination of $R_3SiO_{1/2}$ (M unit), $R_2SiO_{2/2}$ (D unit), $RSiO_{3/2}$ (T unit) and/or $SiO_{4/2}$ (Q unit) in the cage-like Si—O—Si structure. It can be made according to procedures in U.S. Pat. Nos. 2,676,182 and 2,814,601, and is also obtained from various commercial sources. A preferred silicone resin has both M unit and Q unit, also known as MQ resin. Preferred R groups of the M unit in MQ resin are a mixture of methyl, hydroxyl, and methoxy. Useful reactive MQ silicone resin in the invention contain 0.05 to 5 weight percent of silicone-bound hydroxyl group and further comprise M and Q units in a mole ratio of from 0.5-1.5 M units for each Q. The MQ resin is soluble in toluene, xylene, heptane, and the like. The mole ratio of $SiO_{4/2}$ (Q unit) to $R_3SiO_{1/2}$ (M unit) ranges from 1:2 to 2:1. One preferred R group is a combination of hydroxyl and methyl groups, with 0.001 to 1 Si—OH for each Si—Me. The preferred MQ resin has a number average molecular weight (Mn) of the functionalized silicone resin is from about 500 to about 200,000 g/mol.

Other useful reactive silicone resin includes silicone MQ resins containing vinyl, phenyl, (meth)acryloxyalkyl, and mixtures thereof for the M units. The silicone MQ resins can be also further treated with $Me_3SiOSiMe_3$, $ViMe_2SiOSiMe_2Vi$, $MeViPhSiOSiPhViMe$, $Me_3SiNHSiMe_3$ or triorganosilane such as $Me_3SiCl$, $Me_2ViSiCl$, $MeViPhSiCl$, (meth)acryloxypropyldimethyl SiCl to reduce the amount of Si—OH in the silicone resin.

The vinylalkoxy functional silane comprises both vinyl and methoxy functional groups, and include $R'_x (R''O)_y Si$ (vinyl)$_{4-n}$, wherein n is 1 to 3; x+y=4−n, y≥1, R' R'' is independently alkyl or aryl group.

Example of the vinylalkoxy functional silane is vinyltrimethoxysilane, vinylmethydimethoxysilane, vinyldimethylmethoxysilane vinyltriethoxysilane, and the like. The vinylalkoxy functional silane will typically be used in amounts of from 0.01 to 20 weight percent, more preferably, 0.1 to 10 weight percent of the whole curable silicone OCA without accounting for the solvent.

Useful catalysts for the reaction mixture can be any acid, or base, and mixtures thereof. Preferred catalysts have a pKa value that has a pKa value equal to or less than −6 or equal to or greater than 15 in a hydrocarbon solvent. Examples of the preferred catalyst are KOH, NaOH, LiOH, organolithium reagents, Grignard reagents, methanesulfonic acid, sulfuric acid, and mixtures thereof. Other examples of the catalyst include organometallic salts of metals such as tin, titanium, aluminum, bismuth. Combination of more than one type of catalysts above can also be used.

Particularly preferred catalysts for the reaction include organolithium reagents. The preferred organolithium reagents includes an alkyl lithium, such as methyl, n-butyl, sec-butyl, t-butyl, n-hexyl, 2-ethylhexyl and n-octyl lithium. Other useful catalysts include phenyl lithium, vinyl lithium, lithium phenylacetylide, lithium (trimethylsilyl) acetylide, lithium silanolates and lithium siloxanolates. Generally, the amount of lithium in the reaction mixture is from 1 ppm to about 10,000 ppm, preferably from about 5 ppm to about 1,000 ppm based on the weight of the reactants. The amount of the organolithium catalyst used in the catalyst system depends on the reactivity of the silanol group-containing reactant and the reactivity of the alkoxysilane containing the polymerizable ethylenically unsaturated group. The amount chosen may be readily determined by those persons skilled in the art. After the reaction, the organolithium catalyst can be reacted with carbon dioxide, precipitated as lithium carbonate and removed from the reaction mixture by liquid-solid separation means such as centrifuging, filtration and the like.

The reaction product is typically formed in an organic solvent or co-solvents, selected from the aliphatic hydrocarbons, aromatic hydrocarbons, diethyl ethers, tetrahydrofuran, ketones, acetates, water and mixtures thereof. Preferred solvents include xylene, toluene, heptane, tetrahydrofuran, and mixtures thereof.

The reaction product undergoes a condensation reaction and yields a product of lightly crosslinked network through Si—O—Si covenant bond among these reactants. At the same time, the reaction releases water and alcohol as by-products. Because many of the reactants silanes and/or siloxane polymer contain functional groups like vinyl, (meth)acrylate, alkoxy and/or H, the reaction products can undergo further crosslinking via heat, UV, water or moisture in the presence of corresponding catalysts. Thus, the condensation reaction products of these reactants can further formulated to give UV-curable, thermal curable, moisture curable, or dual curable pressure sensitive adhesives, as describe in the invention.

The thermal curable pressure sensitive adhesive composition in the invention further comprises the reaction product of the above and a hydride (SiH) functional siloxane polymer and a thermal curing catalyst. The term "thermal or heat cure" herein refers to toughening, hardening or vulcanization of the curable portion of the adhesive through exposure to heat in oven, infrared (IR), near IR, or microwave. The heat cure temperature is between 50-200° C., preferably 60-150° C. The initiation of the heat cure is achieved through the addition of an appropriate thermally curing catalyst.

The hydride functional siloxane polymer is a polydiorganosiloaxane polymer having SiH hydride functional group. In a preferred embodiment, polydiorganosiloaxane polymer is polydialkylsiloxane, polydiaryysiloaxane, polyalkylarylsiloaxane polymer, with at least two or more (RR-'SiO) unit, wherein R and R' are alkyl or aryl. In a most preferred embodiment, hydride functional siloxane polymer is polydimethylsiloxane polymer with (1) terminal functional groups of $SiMe_2H$, (2) pedant functional groups of SiMeH, or (3) mixtures thereof.

The siloxane polymer with pedant functional groups of SiMeH has a structure of $(SiR'R''O)_m-(SiRH)_n-$, wherein R, R', and R'' are independently alkyl, aryl group. The mole percentage of n/(m+n) is from about 0.1 to 50%, preferably from about 1-20%.

The hydride functional siloxane polymer has a number average molecular weight of the reactive silicon resin is from about 134 to 100,000 g/mol, preferably from about 200 to about 50,000 g/mol.

The catalyst for the thermal curable silicone pressure sensitive adhesive composition in the invention is a transition metal complex of Pt, Rh, Ru. The preferred catalyst is Speier's catalyst $H_2PtCl_6$, or Karstedt's catalyst, or any alkene-stabilized platinum(0). The utility of non-transition metal catalysts including early main group metals, Lewis acidic alane, borane and phosphonium salts as well as N-heterocyclic carbenes has also been disclosed.

There are two forms of thermal curable thermal curable silicone OCA in the invention: 1K as one component, or 2K as two components.

As for the 1K thermal curable pressure sensitive adhesive, a hydride functional siloxane polymer and a thermal cure catalyst are added to form 1K thermal curable pressure sensitive adhesive. An inhibitor is added to 1K thermal curable pressure sensitive adhesive solution, as well known in the art. Examples of the inhibitor, includes α-acetylenic compounds, such as acetylenic alcohols, acetylenic a,a'-diols, 2-methyl-3-butyn-2-ol and ethynylcyclohexanol (ECH), 2,4,7,9-tetramethyl-5-decyne-4,7-diol (TMDD), 4,7-dimethyldec-5-yne-4,7-diol, 3,6-dimethyloct-4-yne-3,6-diol, tetradec-7-yne-6,9-diol, 3,6-diisopropyl-2,7-dimethyl-oct-4-yne-3,6-diol, 1,3-Divinyltetramethyldisiloxane; vinyltrimethylsilane, divinyldimethylsilane, 3-methyl-3butyn-3-ol, dimethyl maleate, dimethyl fumarate, diethyl fumarate, and a mixture thereof.

As for the 2K thermal curable pressure sensitive adhesive, part A contains the reaction solution and the thermally curing catalyst are added. The solid content of the reaction is from about 20 to 80%, and can be adjusted by adding or removing solvent. Part B is 100% of the hydride functional siloxane polymer, or a mixture of the reaction solution and hydride functional siloxane polymer. Part A and Part B are combined together to form the final curable adhesive composition. The open time is between 1 to 24 h.

For both 1K and 2K thermal curable adhesives, the adhesive is applied onto a release liner as a coating, with a specified gram weight per square meter (GPSM), and the solvent is evaporated and the adhesive is cured at the same time in an oven of 50-200° C., preferably 60-150° C., to form a cured adhesive film. A second liner is applied onto the fully cured adhesive film. The laminated film may then be transported or stored for later use.

The cured adhesive film may be laminated on assembly lines of electronic devices to between different layers and join them in the device. The cured film is preferred applied under vacuum and/or pressure to enhance lamination and to remove any entrapped air (voids) between the layers. Heat may optionally be used to improve the lamination process. Preferably, the optional temperature in lamination process is below 110° C., and in some applications below about 80° C. because organic active components in the electronic devices may decompose at temperatures at high temperatures.

Upon curing, the thermally cured silicone optically clear adhesive has a balance of both elastic shear modulus (G') at 25° C., less than about $1.5 \times 10^6$ dyn/cm, and T-peel adhesion, greater than about 1 oz/in between two PET substrates according to ASTM D1876.

Yet another aspect of the invention is directed to a method of forming a thermally curable silicone optically clear adhesive comprising the steps of:

(1) preparing a reaction product by mixing in an organic solvent at 60 to about 150° C. of;
 (i) about 1 to about 30% of a high molecular weight hydroxy terminated siloxane polymer having a number average molecular weight greater than about 50,000 g/mol;
 (ii) about 10 to about 50% of a low molecular weight hydroxy terminated siloxane polymer having a number average molecular weight less than about 30,000 g/mol;
 (iii) about 10 to about 50% of a reactive silicone resin;
 (iv) about 0.1 to about 10% of a vinylalkoxy functional silane; and
 (v) about 0.001 to about 1% of (v1) an acid having a pKa value equal to or less than −6 or (v2) a base catalyst having a pKa value equal to or greater than 15;
(2) adding about 0.1 to about 10% of a hydride functional siloxane polymer; and about 0.001 to about 5% of a thermally curing catalyst at room temperature.

The condensation reaction of the hydroxyl terminated siloxane polymers, the reactive silicone resin, vinylalkoxysilane, occurs in the presence of the acid or base catalyst in the organic solvent. The condensation reaction takes place at room temperature or at an elevated temperature or up to about 150° C. The preferred temperature is in the range of about 60 to about 120° C. Typically, the reaction is from about 1 to about 24 hours.

Optionally, hexamethadisilazane can be added to react with any residual hydroxyl groups at the end of the condensation reaction. The reaction is terminated by either introducing $CO_2$ gas if the base catalyst is used, or by adding $Na_2CO_3$ if acid catalyst is used for the condensation reaction. The solid content of the mixture is from about 20 to 80%, and can be adjusted by adding or removing solvent. The obtained adhesive solution will be readily used to make thermal curable pressure sensitive adhesive films.

Another aspect of the invention is directed to a UV curable silicone optically clear adhesive composition comprising a mixture of:

(a) about 95 to about 99.999% of a reaction product of:
 (i) about 1 to about 30% of a high molecular weight hydroxy terminated siloxane polymer having a number average molecular weight greater than about 50,000 g/mol;
 (ii) about 10 to about 50% of a (meth)acryloxyalkyl alkoxy terminated siloxane polymer having a number average molecular weight less than about 50,000 g/mol;
 (iii) about 10 to about 50% of a reactive silicone resin;
 (iv) optionally, about 0.1 to about 10% of a (meth) acryloxyalkyl alkoxy functional silane; and
 (v) about 0.001 to about 1% of (v1) an acid having a pKa value equal to or less than −6 or (v2) a base catalyst having a pKa value equal to or greater than 15; in an organic solvent at elevated temperature of about 60 to about 150° C.; and
(b) about 0.001 to about 5% of a photoinitiator.

Similar to the thermally curable silicone optically clear adhesive, the reaction product for the UV curable silicone optically clear adhesive composition also requires the same (i) high molecular weight hydroxy terminated siloxane polymer, (iii) reactive silicone resin; and (iv) acid or base catalyst, described herein. The reaction product is formed in an organic solvent.

The (meth)acryloxyalkyl alkoxy terminated siloxane polymer is a polydiorganosiloxane polymer having α,ω-endcapped $RR'_nR''_{2-n}SiO$, wherein R is (meth)acryloxyethyl, or (meth)acryloxypropyl; R' is alkoxy; and R" is alkyl. The (meth)acryloxyalkyl alkoxy terminated siloxane polymer is a siloxane polymer having terminated functional groups of both (meth)acrylate and alkoxylsilyl functional groups. Preferred alkoxysilyl functional groups are trimethoxylsilyl, dimethoxymethylsilyl, triethoxylsilyl and/or diethoxymethylsilyl functional groups. In a preferred embodiment, the (meth)acryloxyalkyl alkoxy terminated siloxane polymer is polydimethylsiloxane with terminal functional groups of (meth)acryloxypropyl dimethoxysilyl, (meth)acryloxyproypl methylmethoxysilyl, (meth)acryloxyethyl dimethoxysilyl, (meth)acryloxyethyl methylmethoxysilyl, or mixtures thereof.

A particularly preferred acryloxyalkyl alkoxy terminated polydimethylsiloxane is available from Henkel Corporation or made in accordance with U.S. Pat. Nos. 5,300,608 or 6,140,444, the content of which is incorporated by reference in its entirety.

Hydroxy or alkoxy terminated siloxane polymer with pedant (meth)acryloxy functional group can also be used either as a replacement of or as a mixture combination with the (meth)acryloxyalkyl alkoxy terminated siloxane polymer. Other (meth)acryloxyalkyl alkoxy functional siloxane polymer that can advantageously be used to replace or mix with acryloxyalkyl alkoxy terminated polydimethylsiloxane are (meth)acryloxyalkyl alkoxy functional acrylic-siloxane blocked or grafted copolymers. An example is a polyacrylate with pendant polydimethylsiloxane and pendant (meth)acryloxyalkyl and alkoxysilyl funcational groups. The amount of polydimethylsiloxane-containing in the acrylic-siloxane copolymers is typically be used in amounts of from 10 to 50 weight percent, more preferably, 1 to 30 weight percent of the total composition.

The number average molecular weight of the (meth)acryloxyalkyl alkoxy terminated siloxane polymer from about 500 to 50,000 g/mol. The preferred average molecular weight of the (meth)acryloxyalkyl alkoxy terminated siloxane polymer from about 1000 to 30,000 g/mol.

The UV curable silicone optically clear adhesive optionally comprises (v) about 0.1 to about 10% of a (meth)acryloxyalkyl alkoxy functional silane.

The (meth)acryloxyalkyl alkoxy functional silane is $XSi(OR')_n R''_{3-n}$ wherein n is 1 to 3, R' R'' is alkyl or aryl group. X is methacryloxyalkyl or acryloxyalkyl group. Examples of (meth)acryloxyalkyl alkoxy functional silanes useful in the invention are (γ-acryloxymethyl)phenethyltrimethoxysilane, (γ-acryloxymethyl)trimethoxysilane, (γ-acryloxypropyl)methylbis(trimethylsiloxy)silane, (γ-acryloxypropyl)methyldimethoxysilane, (γ-acryloxypropyl)methyldiethoxysilane, (γ-acryloxypropyl)trimethoxysilane, (γ-acryloxypropyl)tris(trimethylsiloxy)silane, (γ-methacryloxypropyl)bis(trimethylsiloxy)methylsilane, (γ-methacryloxymethyl)bis(trimethylsiloxy)methylsilane, (γ-methacryloxymethyl)methyldimethoxysilane, (γ-methacryloxymethylphenethyl)tris(trimethylsiloxy)silane, (γ-methacryloxymethyl)tris(trimethylsiloxy)silane, (γ-methacryloxypropyl)methyldimethoxysilane, (γ-methacryloxypropyl)methyldiethoxysilane, (γ-methacryloxypropyl)triethoxysilane, (γ-methacryloxypropyl)triisopropoxysilane, (γ-methacryloxypropyl)trimethoxysilane,(γ-methacryloxypropyl)tris(methoxyethoxy)silane, (γ-methacryloxypropyl) tris(trimethylsiloxy)silane. Preferably, the (meth)acryloxyalkyl alkoxy functional silanes having (meth)acryloxy group is selected from (meth)acryloxyalkyl alkoxy functional silane is (meth)acryloxypropyl trimethoxysilane; (meth)acryloxypropyl methyldimethoxysilane, (meth)acryloxyethyl trimethoxysilane, or (meth)acryloxyethyl methyldimethoxysilane.

The reaction product undergoes a condensation reaction and yields a product of lightly crosslinked network through Si—O—Si covenant bond among these reactants.

The UV curable optically clear adhesive composition further comprises the reaction product composition and a photoinitiator. The usable photoinitiator (b) in the invention generates free radicals by UV and/or visible light and cures the adhesive. The term UV curable herein refers to crosslinking, toughening, hardening or vulcanization of the curable portion of the adhesives through actinic radiation exposure. Actinic radiation is electromagnetic radiation that induces a chemical change in a material, including electron-beam curing. In most cases, such radiation is ultraviolet (UV) or visible light. The initiation of radiation cure is achieved through the addition of an appropriate photoinitiator. The cure of the adhesive is achieved by direct exposure to ultraviolet (UV) or visible light or by indirect exposure through transparent cover sheet that are made of polyester, polyamide, polycarbonate, glass, and the like.

The selection of a photoinitiator for the radiation curable adhesive is familiar to those skilled in the art of radiation and heat cure, and is highly dependent on the specific applications in which the adhesives are to be used. The photoinitiator is a UV cleavable photoinitiator, and may comprise one or more types of photoinitiator and optionally one or more photosensitizers. Radical photopolymerization initiating system comprising one or more photoinitiators and photosensitizers can be found in Fouassier, J-P.,Photoinitiation, Photopolymerization and Photocuring Fundamentals and Applications 1995, Hanser/Gardner Publications, Inc., New York, N.Y. Suitable radical photoinitiators include Type I alpha cleavage initiators such as acetophenone derivatives such as 2-hydroxy-2-methylpropiophenone and 1-hydroxycyclohexyl phenyl ketone; acylphosphine oxide derivatives such as bis(2,4,6-trimethylbenzoyl) phenylphosphine oxide; and benzoin ether derivatives such as benzoin methyl ether and benzoin ethyl ether. Type II photointiators are also suitable for the curable adhesive, and they include benzophenone, isopropylthioxanthone, and anthroquinone. Many substituted derivatives of the aforementioned compounds may also be used. A suitable photoinitiator is one that exhibits a light absorption spectrum that is distinct from that of the resins, and other additives in the adhesive.

In one embodiment, the UV curable silicone optically clear adhesive film is cured through an optical clear cover sheet or front sheet, and the photoinitiator must be capable of absorbing radiation at wavelengths for which the cover or substrate sheets are transparent. For example, if an adhesive is to be cured through a sodalime glass coverplate, the photoinitiator must have significant UV absorbance above 320 nm. UV radiation below 320 nm will be absorbed by the sodalime glass coverplate and cannot reach the photoinitiator in the adhesive films. In this example, it would be beneficial to use a red shifted photoinitiator, or a photosensitizer with the photoinitiator as one photoinitiating system, to augment the transfer of energy to the photoinitiator. If an adhesive is to be cured through a PET film with cut-off absorbance at 400 nm and below, the photoinitiator or photosensitizer must have UV absorbance above 400 nm. In particular, photoinitiator moieties having acyl phosphine oxides are preferred, e.g., monoacyl phosphine oxide (MAPO) and bis(acyl)phosphine oxide (BAPO). Examples of such photointiators include, but are not limited to, IRGACURE® 819, IRGACURE® 2022, LUCIRIN® TPO, LUCIRIN® TPO-L, which are commercially available from BASF. The range of UV radiation may be modified as necessary, and such modifications are within the expertise of the practitioner skilled in the art.

The amount of the photoinitiator used in the UV curable silicone optically clear adhesive is typically is in a range of about 0.001 to about 10 wt %, preferably, from about 0.01 to about 5 wt %, based on the total weight of the adhesive, not accounting for the solvent.

The UV curable silicone optically clear adhesive composition may further comprises a moisture curing catalyst which initiates the moisture curing of the composition in the presence of moisture. The moisture curing catalysts typically used in the UV and moisture dual-curable silicone optically clear adhesive in the invention include those known to the person skilled in the art to be useful for facilitating moisture curing. The catalysts include metal and non-metal catalysts. Examples of the metal portion of the metal catalysts useful in the present invention include tin, titanium, zirconium, lead, iron cobalt, antimony, manganese, bismuth and zinc compounds. In one embodiment, the tin compounds useful for facilitating the moisture curing of the composition include but are not limited to dimethyldineodecanoatetin (available from Momentive Performance Materials Inc. under the trade name of FOMREZ UL-28 A), dibutyltindilaurate, dibutyltindiacetate, dibutyltindimethoxide, tinoctoate, isobutyltintriceroate, dibutyltinoxide, solubilized dibutyl tin oxide, dibutyltin bisdiisooctylphthalate, bis-tripropoxysilyl dioctyltin, dibutyltin bis-acetylacetone, silylated dibutyltin dioxide, carbomethoxyphenyl tin trisuberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexoate, tinbutyate, dioctyltin didecylm ercaptide, bis (neodecanoyloxy)dioctylstannane, dimethylbis(oleoyloxy) stannane. In one preferred embodiment, the moisture curing catalyst is selected from the group consisting of dimethyldineodecanoatetin (available from Momentive Performance Materials Inc. under the trade name of FOMREZ UL-28, dioctyltin didecylmercaptide (available from Momentive Performance Materials Inc. under the trade name of FOMREZ UL-32), bis(neodecanoyloxy)dioctylstannane (available from Momentive Performance Materials Inc. under the trade name of FOMREZ UL-38), dimethylbis(oleoyloxy) stannane (available from Momentive Performance Materials Inc. under the trade name of FOMREZ UL-50), and combination thereof. More preferably, the moisture curing catalyst is dimethyldineodecanoatetin. In the moisture and UV curable adhesive composition according to the present invention, the moisture curing catalyst is present in an amount from 0.1 to 5% by weight, preferably 0.1 to 5% by weight, based on the total weight of the adhesive, not accounting for the solvent.

The curable silicone optically clear adhesive can further comprise, optionally, sliane adhesion promotors, hydrolyzable polymeric/oligomeric adhesion promoters. Examples of silane adhesion promoters that are useful include, but are not limited to, C3-C24 alkyl trialkoxysilane, (meth)acryloxypropyl trialkoxysilane, chloropropylmethoxysilane, vinylthmethoxysilane, vinylthethoxysilane, vinyltrismethoxyethoxysilane, vinylbenzylpropylthmethoxysilane, aminopropyltrimethoxysilane, vinylthacetoxysilane, glycidoxypropyltrialkoxysilane, beta.-(3,4-epoxycyclohexyl)ethyltrimethoxysilane, mercaptopropylmethoxysilane, aminopropyltrialkoxysilane, and the like. However, silane adhesion promoters that reacts and degrades any active organic component should not be added to adhesives intended for use in electronic device. Examples of functional polymeric and/or oligomeric adhesion promoters that are useful include, but are not limited to, hydrolysable PDMS polymer or oligomer, e.g., PDMS that is endcapped with trialkoxysilyl (meth)acrylates, dialkoxysilyl (meth)acrylates or methacrylates groups. The adhesion promoter will typically be used in amounts of from 0.2 to 40 weight percent, more preferably, 1 to 20 weight percent of the whole curable silicone PSA. A particularly preferred polymeric and/or oligomeric adhesion promoters is (meth)acryloxalkyldimethoxy terminated PDMS made by Henkel Corporation, according to U.S. Pat. No. 5,300,608. Occasionally, as known in the art, catalyst is together with the adhesion promoters for better results, in typically amounts of from 0.001 to 5 weight percent of the whole curable silicone OCA. Examples of such catalyst that are useful include, but are not limited to, amines, adhesion promotor catalyst and tin catalyst, e.g., dibutyltin dilaurate.

In a further aspect of the invention is directed to a method of forming a UV curable silicone pressure sensitive adhesive comprising the steps of:

(1) prepare a reaction product by mixing in an organic solvent at about 60 to about 150° C. in an organic solvent:
  (i) about 1 to about 30% of a high molecular weight hydroxy terminated siloxane polymer having a number average molecular weight greater than about 100,000 g/mol;
  (ii) about 10 to about 50% of a (meth)acryloxyalkyl alkoxy terminated siloxane polymer having a number average molecular weight less than about 50,000 g/mol;
  (iii) about 10 to about 50% of a reactive silicone resin;
  (iv) about 0.1 to about 10% of a (meth)acryloxyalkyl alkoxy functional silane;
  (v) about 0.001 to about 1% of (v1) an acid having a pKa value equal to or less than −6 or (v2) a base catalyst having a pKa value equal to or greater than 15;

(2) adding about 0.001 to about 5% of a photoinitiator at room temperature; and

The moisture curing catalyst and other optional components, sliane, hydrolyzable polymeric and/or oligomeric adhesion promoters, can be added either to the reaction product or with the photoinitiator.

The solid content of the mixture is from about 20 to 80%, and can be adjusted by adding or removing solvent.

The curable silicone optically clear adhesive solution in the invention have a Brookfield viscosity range of from about 100 to about 100,000 cps in the ranges of about 20-40° C., preferably about 1,000 to about 10,000 cps at 25-30° C. Such viscosity ranges allow the adhesive to be coatable into 15-250 um thickness films at ambient temperature. The viscosity is adjustable by solid % from 20 to 80%. The adhesive solution can be coated into PSA films for lab testing using the solution film applicator in lab. The coating procedure is well-known to those skilled in the art. The adhesive can be formed as a PSA film by applying the adhesive solution onto a release liner as a coating, with a specified gram weight per square meter (GPSM), and evaporating the solvent by air or in an oven at an elevated temperature, whereby the film is either fully cured if the adhesive is thermal curable, or remains as uncured but solvent-free PSA film if the adhesive is UV curable or dual-curable. A second release-liner is applied onto the substantially solvent-free PSA film, to form a laminate PSA film in between the two release liners. Exemplary release liners include PET film, Kraft paper with fluoro-silicone release coatings.

The curable silicone OCA film can be delivered in fully cured films or UV-curable film. The electronic device utilizing the inventive optically clear film is assembled in various ways. In one embodiment, the silicone OCA is delivered as a film between the two release liners as described above. After one release liner is removed, the exposed adhesive film is laminated to either the front cover sheet or the back substrate of the device. Subsequently, the other release liner is removed and the exposed adhesive surface is then laminated to the remaining front sheet or the substrate. Lamination process, with a rubber roller laminator, under pressure in autoclave, heat and/or vacuum may be used to enhance lamination quality and to avoid voids or trapping air. The laminated device is then subject to cure with UV irradiation if the OCA film is not yet cured by UV. In another embodiment, the adhesive film is laminated to both front cover sheet and the back substrate simultaneously.

The UV curable OCA of the invention is cured through the top substrate by exposure to electromagnetic irradiation comprising a wavelength ranging from 200 nm to 700 nm, preferably from 450 nm to 500 nm. The curing degree can be determined by measuring the decrease of the IR absorption at an absorption peak which is characteristic to the corresponding formulation chemistry. This is well established to the person skilled in the art. UV-irradiation can be supplied with a continuous high intensity emitting system, such as those available from Fusion UV Systems. A metal halide lamp, LED lamp, high-pressure mercury lamp, xenon lamp, Xenon flash lamp etc. can be used for UV cure, with an energy range of about 1 to about 5 J/cm$^2$.

The optically clear films described herein require no in situ coating, and therefore, have a simple lamination and assembly process over LOCA. For substrates that contain indentations created by components on substrates such as, electrodes, bus bars, ink steps, and integrated circuits, low modulus provides good substrate wet-out, and good void filling during the assembly process.

In another embodiment, the adhesive is first UV cured and then laminated onto the front cover sheet and the back substrate in the cured state. The cured pressure sensitive adhesive film still has enough tack and grab and adheres onto the substrates.

Upon curing, the UV cured silicone optically clear adhesive has a balance of both elastic shear modulus (G') at 25° C., less than about 1.5×10$^6$ dyn/cm, and T-peel adhesion, greater than about 1 oz/in between two PET substrates according to ASTM D1876.

There are several ways to incorporate the fully cured OCA films or UV curable OCA films of the invention between the cover lens and the display module substrate in the LCD, LED, touch panel display devices. The cured OCA films or UV curable OCA of the invention is preferably applied on the cover lens. The cured OCA film or UV OCA films is typically protected between two release liners, the first liner is thinner (25-50 μm) and easier to remove, and the other is thicker (75-100 μm) and has higher release force. The cured OCA film or UV OCA, after the first liner is removed, is applied onto the cover lens by pressing and laminating in one direction by a rubber roll. The second release liner is then removed and the exposed surface of the adhesive film is laminated unto the display module substrate, preferably under vacuum (<0.1 MPa) and/or pressure in autoclave (<0.5 MPa). Vacuum condition is preferred for a bubble-free bonding. Heating may also be applied, preferably in the rage of about 40 to about 80° C.

In a preferred embodiment, the top substrate is selected from glass or polymer film, preferably plastic films, including in particular polyethylene terephthalate, polymethyl (meth)acrylate, polyimide film, and/or triacetate cellulose (TAC). In another preferred embodiment, the top substrate is a reflector, cover lens, touch panel, retarder film, retarder glass, LCD, lenticular lens, mirror, anti-glare or anti-reflective film, anti-splinter film, a diffuser or an electromagnetic interference filter. For example for 3D TV applications, a glass or film retarder will be bonded onto a LCD for passive 3D TV, or a TN LCD or lenticular lens is bonded a regular TFT LCD for naked eye 3D. The base substrate is a LCD module with polarizer film on top. The base substrate can be a display panel, preferably selected from a liquid crystal display, a plasma display, a light-emitting diode (LED) display, an electrophoretic display, and a cathode ray tube display.

In one embodiment, the UV curable adhesive is useful as an encapsulant for flexible photovoltaic module/cell (interchangeably used herein). The photovoltaic module assembly includes any article or material that can convert light into electrical energy. In forming the photovoltaic cell, the encapsulant sheet or roll, comprising the curable adhesive film, is laminated to the photovoltaic module assembly. The flexible photovoltaic cell, including the encapsulant, must be sufficiently transparent to allow adequate sunlight or reflected sunlight to reach the photovoltaic cells and withstand folding and bending curvature during its usage.

The silicone cured optically clear films of the invention have a low modulus upon UV or heat cure, especially in the temperature range of −40 to 200° C. and with minimal or zero cold flow in storage. The cured optically clear film can withstand shipping and storage temperatures under stress. The sheets and rolls can later be die cut into desirable sizes and shapes. The cured optically clear films have good peel strength to substrates. Balanced peel adhesion and soft modulus are important to avoid delamination between adhesive layer and substrate, when flexible electronic devices are subject to bending, or rigid devices at vertical position for a long period of time. Low elastic modulus indicates that an adhesive is soft and can easily wet-out rough substrates to fill voids. Due to the low modulus, the adhesive film will also not impose any Mura on an electronic display device, e.g., LCD, while significantly improving the performance of the display device. Mura can be minimized if the optically clear adhesive films are soft after the cure in a wide range of temperatures. The elastic modulus measurement is well known to a person skilled in the art. The elastic modulus values recorded in this document have been measured with a photo rheometer or RDA. The elastic shear modulus (G') of the cured adhesive is preferably to be less than 1.5×10$^6$ dyn/cm$^2$ at 20° C. and 10 rad/s after cure.

The T-peel adhesion test was performed on Instron, in accordance with ASTM D1876, a well-known measurement to a person skilled in the art. T-peel test ASTM D1876 evaluates the force required to the progressively separate two bonded, flexible adherents. Variations in test specimen preparation such adhesive curing level, adhesive thickness, adherents and conditioning provides insight for optimization in processes and application. The cured silicone OCA of the invention preferably has T-peel adhesion of 1 oz/in between two PET substrates.

Optical properties (T %, haze % and yellow index b*) of the cured OCA film can be measured using Cary 300 from Agilent, in accordance with ASTM E903 and ASTM D1003. The adhesive is considered to be optically clear, if the cured silicone adhesive film exhibits an optical transmission of at least 90%, preferably >99% between glass slides, over 500-900 nm range, and with haze and yellowness b*<1%.

The optically clear films are particularly suitable for manufacturing flexible and foldable display devices, particularly those requires optical clarity and/or touch sensory. Furthermore, the adhesive film of the invention may be in a single layer or in a multilayer form in the device.

EXAMPLES

Hydroxy terminated polydimethylsiloxane (Mn 95,000 g/mol) is commercially available from Wacker.

Hydroxy terminated Polydimethylsiloxane (Mn 13,000 g/mol), Karstedt's catalyst, vinyltrimethoxysilane, hydride terminated polydimethylsiloxane (Mn 6,000 g/mol), methacryloxypropoxytrimethoxy silane are available from Gelest.

PDMS-DA is methacryloxypropyltrimethoxy terminated polydimethylsiloxane (Mn 22,000 g/mol), commercially available from Henkel.

Silicone MQ resin is a hydroxyl functional silicone resin (Mn ~5000 g/mol) commercially available from Dow Corning, Momentive and Wacker.

Heptane and n-butyl lithium (1.6M in hexane) (nBuLi) are commercially available from Aldrich.

LUCIRIN TPO is a commercially available photoinitiator from BASF.

Tests Temperature Sweep Test: A Rheometrics Dynamic Mechanical Analyzer (Model RDA 700) was used to obtain the elastic moduli (G'), loss modulus (G") and tan delta versus temperature sweep. The instrument was controlled by Rhios software version 4.3.2. Parallel plates 8 mm in diameter and separated by a gap of about 2 mm were used. The sample was loaded and then cooled to about −100° C. and the time program started. The program test increased the temperature at 5° C. intervals followed by a soak time at each temperature of 10 seconds. The convection oven was flushed continuously with nitrogen. The frequency was maintained at 10 rad/s. The initial strain at the start of the test was 0.05% (at the outer edge of the plates). An autostrain option in the software was used to maintain an accurately measurable torque throughout the test. The option was configured such that the maximum applied strain allowed by the software was 80%. The autostrain program adjusted the strain at each temperature increment if warranted using the following procedure. If the torque was below 200 g-cm the strain was increased by 25% of the current value. If the torque was above 1200 g-cm it was decreased by 25% of the current value. At torques between 200 and 1200 g-cm no change in strain was made at that temperature increment. The shear storage or elastic modulus (G') and the shear loss modulus (G") are calculated by the software from the torque and strain data. Their ratio, G"/G', also known as the tan delta, was also calculated.

T-peel test: The T-peel adhesion test was performed on Instron Sintech 1/D, in accordance with ASTM D1876. The procedure was as follows: (1) transfer adhesive films to between two 2-3 mil PET films; (2) UV cure the laminated adhesive with D-bulb (Fusion Systems) with a dosage of UVA&V 1-5 J/cm$^2$; (3) cut samples to 1.0 in wide×6-12 in long strips; (4) condition at 23° C. and 50% relative humidity for 12 hr; (5) perform the T-peel adhesion at 23° C. and 50% relative humidity: clamp each ends of the T-peel specimen in separate test grips of the Instron (at a rate of 12.0 in/min) length of the bond line.

Transmission test: Optical properties (T %, haze % and yellow index b*) were measured with a spectrometer, Cary 300 from Agilent, in accordance with ASTM E903 and ASTM D1003. The test method for transmission was as follows: (1) place a small film of adhesive on a 75 mm by 50 mm plain micro slide (a glass slide from Dow Corning, Midland, Mich.), that had been wiped three times with isopropanol; (2) attach a second glass slide onto the adhesive under a force; (3) cure the adhesive with a D-bulb (Fusion Systems) at UVA&V 1-5 J/cm$^2$; and measure the optical transmission from 300 to 900 nm with the spectrometer.

Example 1-7: Procedure of making thermally curable silicone optically clear adhesives is as follows. A mixture of hydroxyl terminated polydimethyl siloxane (MW 95K and 13K), silicone MQ resin (33 g), vinyltrimethoxysilane, and heptane (60 g) was stirred at reflux for 2 hours with $N_2$ gas blanket. n-BuLi (0.3 mL, 1.6M in hexane) was added to the mixture and this was mixed for an additional one hour. The reaction mixture was purged with $CO_2$ for 1 hour, followed by $N_2$ for 1 hour. Hydride terminated polydimethyl siloxane and Karstedt's catalyst were added to the mixture. The product was cooled to room temperature and packed in a glass jar. Components and properties are shown in Table 1. The RDA T Sweep of Ex 1(C) and 7, are shown in FIG. 1, rheology data of Examples 1(C) and 7. Line ■ is shear modulus G' of Example 1, and line □ is tan delta of example 1; Line ▲ is shear modulus G' of Example 7, and line △ is tan delta of Example is 7.

TABLE 1

| Examples | 1(C) | 2(C) | 3(C) | 4(C) | 5 | 6 | 7 |
|---|---|---|---|---|---|---|---|
| Hydroxy terminated Polydimethylsiloxane (Mn 95,000 g/mol) | 5 | 25 | 10 | 5 | 5 | 5 | 6 |
| Hydroxy terminated Polydimethylsiloxane (Mn 13,000 g/mol), | 20 | X | 15 | 25 | 20 | 20 | 17 |
| Silicone MQ resin, | 25 | 25 | 25 | 20 | 25 | 25 | 25 |
| Vinyltrimethoxysilane | X | 1 | 1 | 1 | 5 | 1 | 1 |
| n-Butyl lithium | 0.01 | 0.01 | 0.01 | 0.01 | 0.01 | 0.01 | 0.01 |
| Hydride terminated polydimethylsiloxane (Mn 6,000 g/mol) | X | 3 | 3 | 3 | 3 | 5 | 3 |
| Karstedt's catalyst, PPM | X | 500 | 500 | 500 | 500 | 500 | 500 |
| T-Peel, oz/in | 5.4 | 8.4 | 2.8 | 0.7 | 5.2 | 2.1 | 5.5 |
| G', × 10$^5$ dyn/cm$^2$, 25° C. | 7.6 | 27 | 16.9 | 5.2 | 1.2 | 7.8 | 7.4 |

Example 1(C) has a good balance of T-Peel and shear modulus G'; however, this was no crosslinked and flowed at temperature above 50° C. This is demonstrated in FIG. 1, where G' and tan delta (δ) of Comparative 1 flows at higher temperature (lower G'). Example 2(C) and 3(C) show that with only or high content of high molecular weight polydimethylsiloxane fails to balance the T-peel and modulus, and the modulus is outside the desired range of about 1.5×10$^6$ dyn/cm$^2$ at 25° C. Example 4(C) shows that with low silicone MQ resin will lead to lower T-peel adhesion. Examples 5-7 had a good balance of T-Peel and shear modulus G' and they are fully crosslinked. In FIG. 1, example 7's G' plateau at elevated temperature (25-200° C.) and resists flow at these elevate temperature. All these adhesives have % T>90%, haze <1% and b*<1%.

Example 8-9: Procedure of making UV curable silicone optically clear adhesives is as follows. A mixture of a mixture of hydrocy terminated polydimethylsiloxanes (MW 95K and 13K), silicone MQ resin, acrylate terminated polydimethylsiloxane, methacrylopropoxytrimethoxyyl silane, and heptane (60 g) was stirred at reflux for 2 hours, with $N_2$ gas blanket. N-BuLi (0.3 mL, 1.6M in hexane) was added and the mixture was mixed for an additional one hour.

Figure 2:
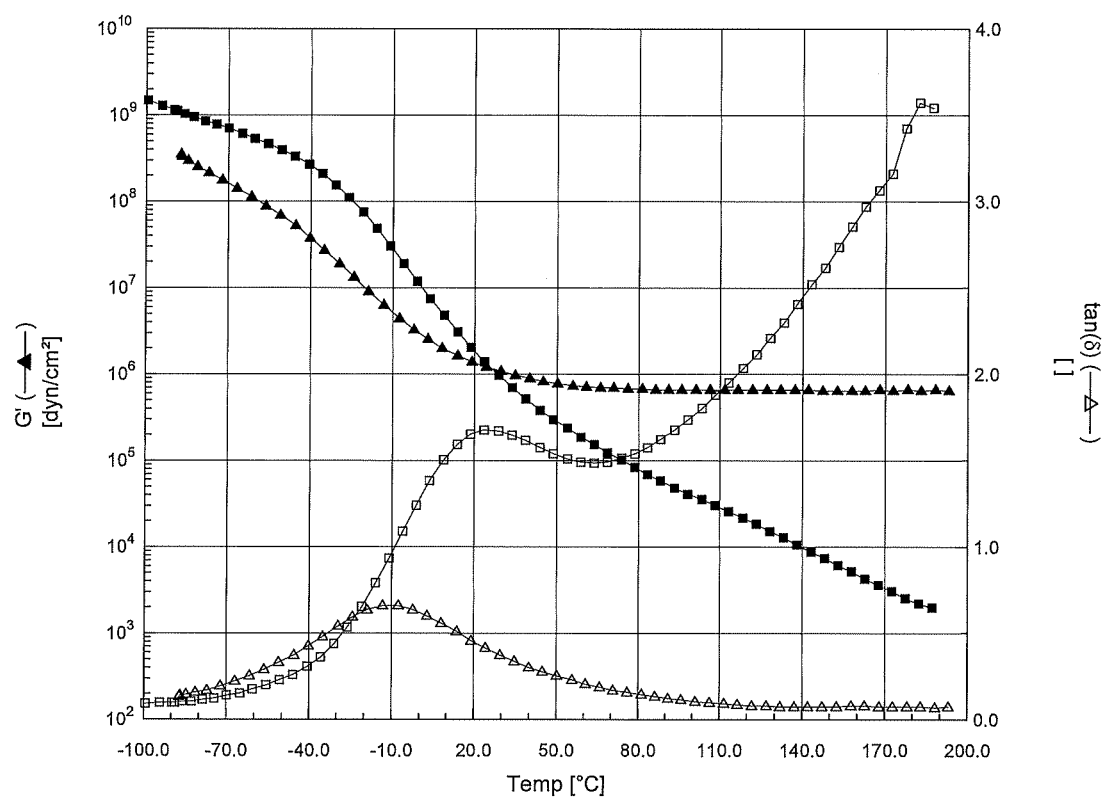
FIG. 2 is a RDA Temperature Sweep (modulus curve and tan delta verses temperature at strain greater than 30%, 10 rad/s) of UV cured silicone pressure sensitive adhesive film.

The reaction mixture was purged with $CO_2$ for 1 hour, followed by $N_2$ for 1 hour. TPO was added. The product was cooled to room temperature and packed in a glass jar. Components and properties are shown in Table 2. The RDA T sweep of Ex 1(C) and 9 are shown in FIG. 2, rheology data of examples 1(C) and 9. Line ■ is shear modulus G' of Example 1(C), and line ☐ is tan delta of Example 1; Line ▲ is shear modulus G' of Example 9, and line Δ is tan delta of Example is 9.

TABLE 2

| Examples | 1 (C) | 8 | 9 |
|---|---|---|---|
| Hydrocy terminated Polydimethylsiloxane (Mn 95,000 g/mol) | 5 | 5 | 5 |
| Hydroxy terminated Polydimethylsiloxane (Mn 13,000 g/mol), | 20 | | |
| PDMS-DA | | 20 | 25 |
| Methacryloproypoxytrimethoxy silane | | 0.2 | |
| Silicone MQ resin | 25 | 25 | 20 |
| n-Butyllithium 1.6M | 0.01 | 0.05 | 0.05 |
| TPO | | 0.01 | 0.01 |
| T-Peel, oz/in | 5.4 | 3.6 | 8.1 |
| G', ×10$^5$ dyn/cm$^2$, 25° C. | 7.6 | 12.4 | 10.5 |

Both examples 8 and 9 had acceptable range of T-peel and G' values, with % T>90%, haze <1% and b*<1%. As shown in FIG. 2, the G' of example 9 plateaus at elevated temperature (25 to 200° C.) and resisted flow at an elevate temperature.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. A thermally curable silicone optically clear adhesive comprising:
    (a) about 95 to about 99.999% of a reaction product of:
        (i) about 1 to about 30% of a hydroxy terminated siloxane polymer having a number average molecular weight greater than about 50,000 g/mol;
        (ii) about 10 to about 50% of a hydroxy terminated siloxane polymer having a number average molecular weight less than about 30,000 g/mol;
        (iii) about 10 to about 50% of a reactive silicone resin;
        (iv) about 0.1 to about 10% of a vinylalkoxy functional silane; and
        (v) about 0.001 to about 1% of (v1) an acid having a pKa value equal to or less than −6 or (v2) a base catalyst having a pKa value equal to or greater than 15;
    (b) about 0.1 to about 10% of a hydride functional siloxane polymer; and;
    (c) about 0.001 to about 5% of a thermally curing catalyst.

2. The thermally curable silicone optically clear adhesive of claim 1, wherein the hydroxy terminated siloxane polymer is polydimethylsiloxane polymers with α,ω-endcapped hydroxy.

3. The thermally curable silicone optically clear adhesive of claim 1, wherein the (iii) reactive silicone resin is tetrafunctional siloxy units (SiO4/2) and triorganosiloxy units (R3SiO1/2), wherein the R is hydroxy group and methyl group,
    wherein the mole ratio of the units of the SiO4/2 to the R3SiO1/2 is from 1:2 to 2:1, and
    wherein the number average molecular weight of the reactive silicon resin is from about 500 to 200,000 g/mol.

4. The thermally curable silicone optically clear adhesive of claim 1, wherein the (iv) vinylalkoxy functional silane is selected from the group consisting of vinyltrimethoxysilane, vinylmethyldimethoxysilane, vinyldimethylmethoxysilane and mixtures thereof.

5. The thermally curable silicone optically clear adhesive of claim 1, wherein the (v) catalyst is selected from the group consisting KOH, NaOH, LiOH, organolithium reagents, Grignard reagents, methanesulfonic acid, sulfuric acid, and mixtures thereof.

6. The thermally curable silicone optically clear adhesive of claim 1, wherein the (b) hydride functional siloxane polymer is polydimethylsiloxane polymer or oligomer with (1) terminal functional groups of SiMe2H, (2) pedant functional groups of SiMeH, or (3) mixtures thereof;
    wherein the number average molecular weight (Mn) of the reactive silicon resin is from about 200 to 50,000 g/mol.

7. The thermally curable silicone optically clear adhesive of claim 1, wherein the (c) thermally curing catalyst is Speier's catalyst H2PtCl6, Karstedt's catalyst or mixtures thereof.

8. A cured composition of the thermally curable silicone optically clear adhesive of claim 1, wherein the cured composition has
    an elastic shear modulus (G') at 25° C., less than about 1.5×106 dyn/cm, and
    T-peel adhesion, greater than about 1 oz/in between two PET films according to ASTM D1876.

9. An article comprising the cured composition of the thermally curable silicone optically clear adhesive of claim 8.

10. A method of forming a thermally curable silicone optically clear adhesive comprising the steps of:
    (1) preparing a reaction product by mixing in an organic solvent at about 60 to about 150° C. of:
        (i) about 1 to about 30% of a hydroxy terminated siloxane polymer having a number average molecular weight greater than about 50,000 g/mol;
        (ii) about 10 to about 50% of a hydroxy terminated siloxane polymer having a number average molecular weight less than about 30,000 g/mol;
        (iii) about 10 to about 50% of a reactive silicone resin;
        (iv) about 0.1 to about 10% of a vinylalkoxy functional silane; and
        (v) about 0.001 to about 1% of (v1) an acid having a pKa value equal to or less than −6 or (v2) a base catalyst having a pKa value equal to or greater than 15; and
    (2) adding about 0.1 to about 5% of a (b) hydride functional siloxane polymer and (c) about 0.001 to about 5% of a thermally curing catalyst at room temperature.

* * * * *

UNITED STATES PATENT AND TRADEMARK OFFICE
CERTIFICATE OF CORRECTION

PATENT NO. : 11,319,471 B2
APPLICATION NO. : 16/774366
DATED : May 3, 2022
INVENTOR(S) : Yuxia Liu, Matthew Ahearn and Abhirami Narthana It is certified that error appears in the above-identified patent and that said Letters Patent is hereby corrected as shown below:

In the Specification

Column 13, Line 14 change "tinbutyate" to --tinbutyrate--.

Signed and Sealed this
Thirty-first Day of January, 2023

Katherine Kelly Vidal
Director of the United States Patent and Trademark Office